June 16, 1925. 1,542,335
E. CARDARELLI
HOSE COUPLING
Filed Jan. 4, 1923
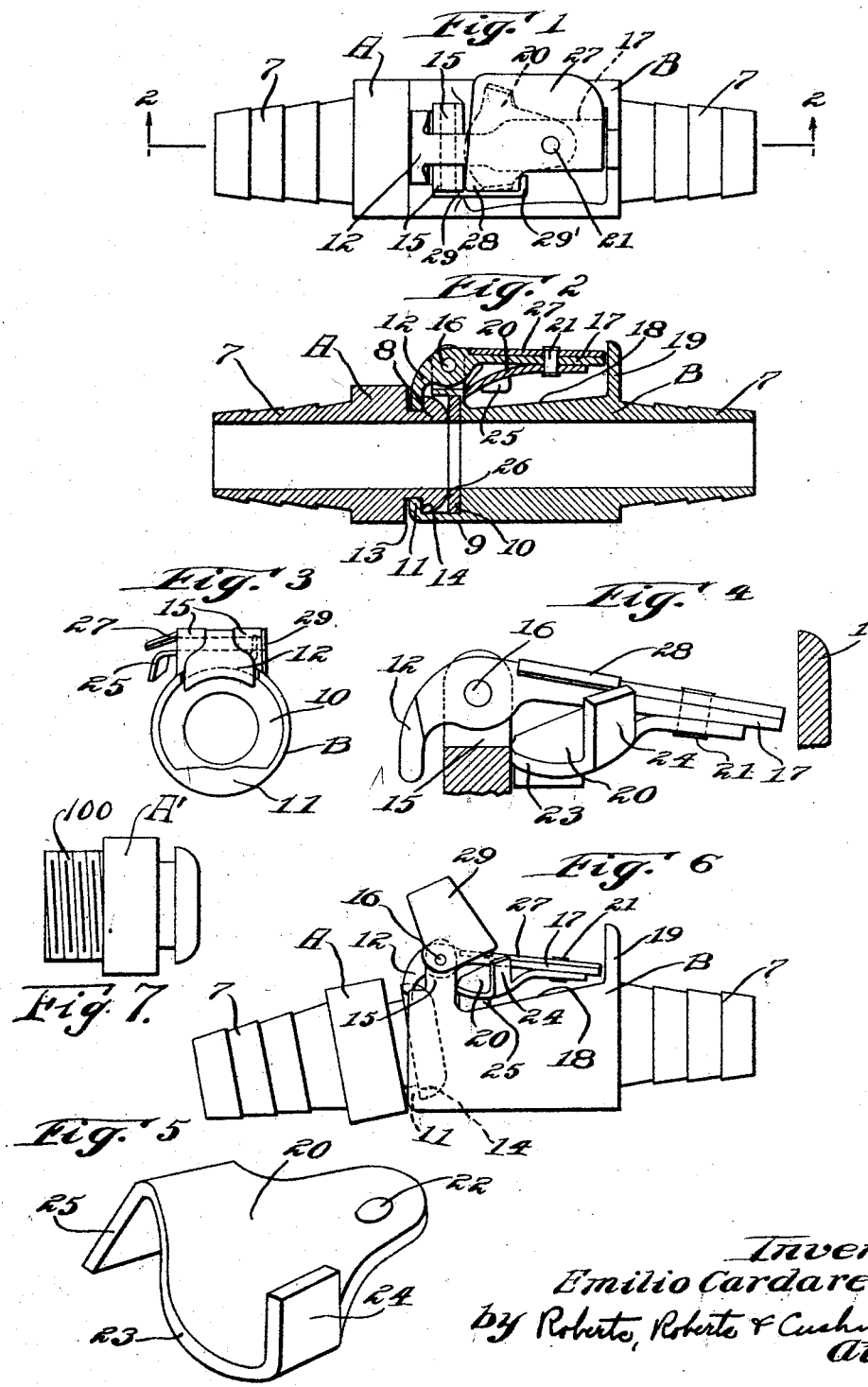
Inventor
Emilio Cardarelli
by Roberts, Roberts & Cushman
Atty's.

Patented June 16, 1925.

1,542,335

UNITED STATES PATENT OFFICE.

EMILIO CARDARELLI, OF BOSTON, MASSACHUSETTS, ASSIGNOR OF ONE-THIRD TO NICOLA PETITTI, OF BOSTON, MASSACHUSETTS.

HOSE COUPLING.

Application filed January 4, 1923. Serial No. 610,691.

*To all whom it may concern:*

Be it known that I, EMILIO CARDARELLI, a citizen of the United States of America, and resident of Boston (Dorchester), in the county of Suffolk and State of Massachusetts, have invented new and useful Improvements in Hose Couplings, of which the following is a specification.

This invention relates to improvements in coupling devices and particularly to structures of this type adapted to be quickly attached and detached, such as hose couplings.

Objects of the invention are to provide a simple, strong and efficient device of this character which has few moving parts, to protect the moving parts against accidental displacement or damage under hard usage, and in general to simplify and to improve prior devices.

In one aspect the invention comprises a hose coupling consisting of mating parts, one part having a member movable to engage the other part to force the parts into engagement and actuating means for the member mounted on the movable member itself, preferably in the form of a cam plate movable generally transversely of the path of movement of the member. The member may comprise a lever pivoted to a lug on one part of the coupling, the cam actuator on the lever being arranged to cooperate with the lug as an abutment. Novel means are provided for protecting the lever and the cam plate pivoted thereon from injury and from accidental displacement.

In another aspect the invention comprises a hose coupling of mating parts with a projection on one part telescoping within the other part and means on the second part arranged to engage the projection to retain the parts in engagement, the means including a fixed member or integral portion of the second part of the coupling arranged to fit in a recess or annular groove in the projection. A movable member or jaw is also provided to engage the shoulder on the projection defined by the recess or groove to force the parts into fluid-tight engagement.

For the purpose of illustration one concrete embodiment of the invention is shown in the accompanying drawings, in which:—

Fig. 1 is a plan view of a hose coupling embodying the features of the invention;

Fig. 2 is a sectional view on the line 2—2 of Fig. 1;

Fig. 3 is an inner end elevational view of the female part of the coupling;

Fig. 4 is an enlarged elevational view of the latching mechanism, adjacent parts of the device being shown in section;

Fig. 5 is an enlarged perspective view of the cam actuator for the latch mechanism;

Fig. 6 is a side elevational view showing the parts as they are engaged or disengaged; and Fig. 7 is a side elevation illustrating a modified form of the male element of the coupling.

The embodiment of the invention chosen for the purpose of illustration comprises a hose coupling consisting of the mating parts A and B. Each part has a ribbed or roughened extension 7 adapted to be inserted within the end of a piece of hose and to be secured therein by any suitable means. Part A of the coupling has an axial projection 8 adapted to telescope within the enlarged bore 9 of member B and to be pressed against a packing ring 10 of rubber or other suitable material in the base of bore 9 to produce fluid-tight engagement of the coupling parts. The means for forcing the parts of the coupling together and retaining them in coupled position are mounted upon part B and comprise an integral portion 11 radially disposed and partly closing the end opening of member B as indicated in Fig. 3. Diametrically opposed to portion 11 is a movable member 12, these two elements being adapted to fit into an annular groove 13 of the projection 8 of member A, this groove defining an annular shoulder or flange 14. As indicated in Fig. 3, member 12 has an arcuate lower edge to fit within the annular groove 13 and this member acts as a jaw bearing against shoulder 14 to force and retain the projection 8 within bore 9 of member B. Member or jaw 12 is the shorter arm of a lever mounted for swinging movement between spaced lugs or ears 15 integral with member B by means of a pivot 16 passing through openings in the lugs and the lever. The long arm 17 of the lever extends axially of member B above a cut-away portion 18 of the latter between lugs 15 and an integral upstanding projection 19 on member B.

When arm 17 is in the lower position indicated in Fig. 6 the parts A and B of the coupling are unlatched and may be separated and when arm 17 is moved upwardly to position indicated in Fig. 2 the parts of the coupling are in locked or operative position. Movement of the lever to operative position is effected by means of a cam plate or actuator 20 shown in enlarged perspective in Fig. 5. Actuator 20 is secured to the under side of lever 17 by means of a pin 21 extending through an opening 22 in the actuator and serving as a pivot on which the actuator may swing in a plane transverse to the path of movement of the lever. The forward edge 23 of actuator 20 forms a cam surface arranged to engage the lower portion of lugs 15 as an abutment, the shape of the actuator being such that on engagement of the cam edge 23 with its abutment the lever arm 17 is forced upward to operative or locked position shown in Fig. 2. For convenience in moving the actuator, the opposite sides thereof have bent portions 24 and 25 serving as thumb or finger pieces.

In the use of the device the mating parts A and B are angularly disposed on initial engagement as indicated in Fig. 6, the annular flange 14 of member A being first inserted within or behind the integral radial member or stop 11 of member B. The two parts are then brought into alignment with the radial flange 14 slipping inwardly beneath jaw 12, the forward portion of the flange being rounded as indicated at 26 (Fig. 2) for this purpose. Pressure is then applied to thumb rest 24 of cam actuator 20 to force the latter inwardly beneath the long arm 17 of the lever which carries jaw 12, cam face 23 bearing against the abutment formed by lugs 15, and raising lever arm 17 to cause jaw 12 to move inwardly thereby forcing projection 8 into fluid tight engagement with washer 10. When the parts are in latched or locking position they are disposed in the manner indicated in Figs. 1 and 2.

To protect the cam actuator 20 from injury or accidental displacement as when the coupling is dragged over the ground and around corners, a protector plate 27 is secured to the upper side of lever arm 17, this plate being of a size to entirely cover the cam actuator when in locked position as shown in Figs. 1 and 2. The edge 28 of this plate may be slightly raised as indicated in Fig. 4 to form a cam surface under which the thumb rest 24 of the cam actuator may wedge when in locked position to yieldingly hold the cam actuator against accidental movement. For further protection of actuator 20 against accidental displacement a keeper in the form of a plate 29 may be provided mounted for pivotal movement about axis 16, this keeper being disclosed in its inoperative position in Fig. 6 and in its operative or locking position in Figs. 1 and 3. The shape of keeper 29 is such that when in locking position it does not project above the adjacent portions of the device such as the lugs 15 and the protector 27. The keeper may have a bent or hook end 29' curving around the inner portion of thumb rest 24 as a further protection for the actuator.

To disengage the parts of the coupling, keeper 29 is raised to the position shown in Fig. 6 and finger rest 25 of the cam actuator 20 is pressed to move the latter out of operative position and to permit lever arm 17 to drop to the position shown in Figs. 4 and 6. Thereupon the part A may be disengaged from part B in the manner indicated in Fig. 6. In Fig. 7 a slight modification of the male member of the coupling is shown, this member being designated A' and having the threaded portion 100 adapted for direct engagement with a faucet or other threaded pipe connection, but being otherwise identical with the part A herein above described.

From the above it will be apparent that the coupling device herein disclosed comprises few parts of strong construction, that the parts of the coupling can be quickly and readily engaged and disengaged and that when in locked or engaged position the movable members which wedge and retain the parts together are completely protected from injury and from accidental displacement.

I claim:

1. A hose coupling comprising mating parts, a lever connected to one part movable to engage the other part to force the parts into fluid tight relationship, and cam means connected to said lever and movable in a plane transverse to the plane of movement of said lever for forcing the lever into operative retaining position.

2. A hose coupling comprising mating parts, a member on one part movable to engage the other part to force said parts into fluid-tight engagement, a cam actuator pivoted to said member and movable in a plane transverse to the movement of said member from inoperative position in which the parts may be separated to operative position in which the parts are locked together, and means for restraining said actuator against accidental displacement when in operative position.

3. A hose coupling comprising mating parts adapted for telescopic engagement, a lever pivoted on one part and having a jaw at one end thereof arranged to engage the telescoping portion of said other part to force and hold said parts in fluid-tight engagement, and cam means connected to said lever and arranged to engage an abutment on said first named part.

4. A hose coupling comprising mating parts adapted for telescopic engagement, a lug projecting from one of said parts, a lever pivoted to said lug and having one arm shaped to form a jaw engaging the other part of said coupling to force and retain the parts in fluid-tight engagement, and a cam actuator pivoted to the other arm of said lever arranged to engage said lug as an abutment.

5. A hose coupling comprising mating parts adapted for telescopic engagement, a lug projecting from one of said parts, a lever pivoted to said lug and having its short arm shaped to form a jaw engaging the other part of said coupling to force and retain the parts in engagement, and a cam actuator pivoted to the under side of the long arm of said lever for cooperation with said lug as an abutment.

6. A hose coupling comprising mating parts adapted for telescopic engagement, a lug projecting from one of said parts, a lever pivoted to said lug and having one arm shaped to form a jaw engaging the other part of said coupling to force and retain the parts in fluid-tight engagement, means for moving said lever from inoperative to operative position comprising a cam actuator pivoted to the other arm of said lever and cooperating with said lug as an abutment, and a keeper for preventing accidental displacement of said actuator.

7. A hose coupling comprising mating parts adapted for telescopic engagement, a lug projecting from one of said parts, a lever pivoted to said lug and having one arm shaped to form a jaw engaging the other part of said coupling to force and retain the parts in fluid-tight engagement, means for moving said lever from inoperative to operative position comprising a cam actuator pivoted to the other arm of said lever and cooperating with said lug as an abutment, and a keeper pivoted to said lug for movement into the path of said actuator when in operative position to prevent accidental displacement of the latter.

8. A hose coupling comprising mating parts adapted for telescopic engagement, a lug projecting from one of said parts, a lever pivoted to said lug and having its short arm shaped to form a jaw engaging the other part of said coupling to force and retain the parts in engagement, and a cam actuator pivoted to the under side of the long arm of said lever for cooperation with said lug as an abutment, and a protector plate on the long arm of said lever covering said actuator when in operative position.

9. A hose coupling comprising mating parts, a projection upon one part telescoping with the other part, said projection having an annular groove defining a shoulder, and means on said other part arranged to engage said shoulder to retain the parts in engagement, said means comprising an integral member radially disposed to fit within said groove and jaw movable in an axial direction to force said projection within said other part, said jaw forming one arm of a lever pivoted to a lug on said other part and being actuated by a cam member pivoted to said lever and arranged to engage said lug as an abutment.

Signed by me at Boston, Massachusetts, this 3rd day of January, 1923.

EMILIO CARDARELLI.